(12) United States Patent
Awata et al.

(10) Patent No.: US 11,570,856 B2
(45) Date of Patent: Jan. 31, 2023

(54) INDUCTION HEATING DEVICE, RADIOACTIVE WASTE MELTING PROCESS DEVICE EQUIPPED WITH SAID INDUCTION HEATING DEVICE, AND RADIOACTIVE WASTE MELTING AND SOLIDIFICATION PROCESS DEVICE

(71) Applicant: DENKI KOGYO COMPANY, LIMITED, Tokyo (JP)

(72) Inventors: Yohei Awata, Tokyo (JP); Keiichi Kubo, Tokyo (JP); Mitsunori Hayashi, Tokyo (JP); Tetsuo Fusato, Tokyo (JP)

(73) Assignee: DENKI KOGYO COMPANY, LIMITED, Tokyo (JP)

( * ) Notice: Subject to any disclaimer, the term of this patent is extended or adjusted under 35 U.S.C. 154(b) by 207 days.

(21) Appl. No.: 16/628,110

(22) PCT Filed: Jul. 2, 2018

(86) PCT No.: PCT/JP2018/025111
§ 371 (c)(1),
(2) Date: Jan. 2, 2020

(87) PCT Pub. No.: WO2019/009261
PCT Pub. Date: Jan. 10, 2019

(65) Prior Publication Data
US 2021/0092804 A1  Mar. 25, 2021

(30) Foreign Application Priority Data
Jul. 3, 2017 (JP) .............................. JP2017-130716

(51) Int. Cl.
*H05B 6/06* (2006.01)
*G21F 9/30* (2006.01)
(Continued)

(52) U.S. Cl.
CPC .............. *H05B 6/067* (2013.01); *G21F 9/305* (2013.01); *H05B 6/04* (2013.01); *H05B 6/367* (2013.01);
(Continued)

(58) Field of Classification Search
CPC ......... G21F 9/305; G21F 9/308; C03B 5/005; C03B 5/021; C03B 2211/70; F27D 11/06;
(Continued)

(56) References Cited

U.S. PATENT DOCUMENTS 5,457,264 A * 10/1995 Kobayashi .............. C03B 5/021
588/19
2010/0080259 A1   4/2010 Lovens
(Continued)

FOREIGN PATENT DOCUMENTS

JP   H05-182754 A   7/1993
JP   2000-131495 A   5/2000
(Continued)

OTHER PUBLICATIONS

Decision to Grant a Patent dated Feb. 20, 2019 for related JP 2017-130716.
(Continued)

*Primary Examiner* — Hung D Nguyen
(74) *Attorney, Agent, or Firm* — Faegre Drinker Biddle & Reath LLP

(57) ABSTRACT

Provided is an induction heating device with which discharging can be easily avoided even when a large electric current is used. The induction heating device comprises a high-frequency power supply provided with a connection portion for an alternating-current power supply, and a heating coil portion connected to the high-frequency power supply. In the heating coil portion, a plurality of coils include n coils surrounding a cavity portion in a plane, wherein the
(Continued)

plurality of coils are mutually connected in series via one of a plurality of capacitors.

11 Claims, 8 Drawing Sheets

(51) Int. Cl.
    *H05B 6/04*         (2006.01)
    *H05B 6/36*         (2006.01)
    *H05B 6/44*         (2006.01)
    *H05B 6/24*         (2006.01)
    *H05B 6/42*         (2006.01)

(52) U.S. Cl.
    CPC .............. *H05B 6/44* (2013.01); *H05B 6/24* (2013.01); *H05B 6/42* (2013.01); *H05B 2206/022* (2013.01)

(58) Field of Classification Search
    CPC .... Y02P 40/50; Y02P 40/52; H05B 2206/022; H05B 6/02; H05B 6/04; H05B 6/06; H05B 6/062; H05B 6/065; H05B 6/067; H05B 6/08; H05B 6/10; H05B 6/101; H05B 6/104; H05B 6/105; H05B 6/108; H05B 6/1254; H05B 6/1263; H05B 6/22; H05B 6/24; H05B 6/36; H05B 6/365; H05B 6/367; H05B 6/40; H05B 6/42; H05B 6/44

USPC ....... 219/660, 661, 662, 668, 671, 672, 676, 219/677

See application file for complete search history.

(56) References Cited

U.S. PATENT DOCUMENTS

| | | | |
|---|---|---|---|
| 2013/0248520 A1* | 9/2013 | Uchida | H05B 6/08 219/662 |
| 2018/0122619 A1* | 5/2018 | Uhm | H01J 37/321 |
| 2018/0145068 A1* | 5/2018 | Scott | H01L 23/535 |
| 2019/0055618 A1* | 2/2019 | Ito | H05B 6/44 |

FOREIGN PATENT DOCUMENTS

| | | |
|---|---|---|
| JP | 2007-73400 A | 3/2007 |
| JP | 2007-317587 A | 12/2007 |
| JP | 2010-287447 A | 12/2010 |
| JP | 2012-504311 A | 2/2012 |

OTHER PUBLICATIONS

Notification of Reasons for Refusal dated Jan. 8, 2019 for related JP2017-130716.

Notification of Reasons for Refusal dated Jul. 31, 2018 for related JP 2017-130716.

International Prelminary Report on Patentability dated Jan. 16, 2020 for PCT/JP2018/025111.

\* cited by examiner

INDUCTION HEATING DEVICE, RADIOACTIVE WASTE MELTING PROCESS DEVICE EQUIPPED WITH SAID INDUCTION HEATING DEVICE, AND RADIOACTIVE WASTE MELTING AND SOLIDIFICATION PROCESS DEVICE

TECHNICAL FIELD

The present invention relates to an induction heating device, a radioactive waste melting apparatus equipped with the induction heating device, such as a glass melting cold crucible high-frequency furnace, and a radioactive waste melting and solidification process device.

BACKGROUND ART

At present, for example, in order to safely dispose of a large amount of radioactive waste, particularly high-concentration radioactive waste liquid, an induction heating device is used in a glass melting cold crucible high frequency furnace body that vitrifies the liquid waste.

Usually, the coil of the induction heating device is integrally formed (Patent Literature 1, Patent Literature 2). Induction heating devices having a plurality of coils are also known (Patent Literature 3, Patent Literature 4, Patent Literature 5).

PRIOR ART

Patent Literature

Patent Literature 1 Japanese Patent Laid-Open No. 2001-133162
Patent Literature 2 Japanese Patent Laid-Open No. 2000-121791
Patent Literature 3 Japanese Patent Laid-Open No. 2001-264491
Patent Literature 4 Japanese Patent Laid-Open No. 2004-093090
Patent Literature 5 Japanese Patent Laid-Open No. 2007-509476

SUMMARY OF THE INVENTION

Problems to be Solved by the Invention

Since a predetermined voltage is required in induction heating, a predetermined voltage is applied to the coil as it is. However, if the voltage applied to the coil is large, there is a risk of causing discharge. For this reason, the component part for preventing discharge, such as an insulator, was large.

Moreover, since the two coils described in Patent Literature 3 are only for performing different processes, the primary coil part has the same problem as the conventional coil.

The plurality of coils described in Patent Literature 4 and Patent Document 5 are also used in purpose of stably floating the molten metal in the crucible and accurately controlling the temperature, therefore the plurality of coils have the same problems as before, and the circuit configuration is also different from the present invention.

It is an object of the present invention to provide an induction heating device capable of reducing electric potential with respect to the ground potential compared to a conventional induction heating device. It is also an object of the present invention to provide a radioactive waste melting process device equipped with the induction heating device, including a glass melting cold crucible high frequency furnace body. In addition to that, it is an object of the present invention to provide a radioactive waste melting and solidification process device equipped with the induction heating device.

Means for Solving the Problems

The induction heating device according to claim 1 one embodiment of the present invention comprises a high frequency power supply having a connection unit to an alternating-current power supply, and a heating coil unit connected to the high frequency power supply, wherein the heating coil section includes a plurality of coils (L1, L2, L3, L4, L5, L6, L7, L8) and a plurality of capacitors (C1, C2, C3, C4, C5, C6, C7, C8), the heating coil part has a cavity portion surrounded by the plurality of coils (L1, L2, L3, L4, L5, L6, L7, L8), the plurality of coils (L1, L2, L3, L4, L5, L6, L7, L8) surround the cavity portion with n coils in a plane, wherein n is an integer of 1 or more, and the plurality of coils (L1, L2, L3, L4, L5, L6, L7, L8) are mutually connected in series via one of the plurality of capacitors (C1, C2, C3, C4, C5, C6, C7, C8).

The above configuration makes it possible to reduce the voltage at the time of heating as compared with the case where only a single coil is used, so that the discharge is less likely to occur. For this reason, since the insulator to be used can be reduced and the space around the furnace body can be widened, workability and safety are improved, and the furnace body arranged at the center of the coil can be easily replaced.

Moreover, even if the furnace body arranged in the center of the coil is enlarged and the gap between the furnace body and the coil is reduced, it is difficult for discharge to occur, thus the processing capacity can be improved by enlarging the furnace body, and the dissolution power efficiency is also improved.

Furthermore, the cavity portion is surrounded by n coils in a plane, so that the coil can be easily manufactured and attached even when the coil is made of a metal plate in preparation for using a large current.

According to one embodiment of the present invention the induction heating device has a plurality of capacities (C1, C2, C3, C4, C5, C6, C7, C8) such that a high frequency voltage applied from the high frequency power source has different phases at the plurality of adjacent coils (L1, L2, L3, L4, L5, L6, L7, L8).

Since the phase of the high frequency voltage at the time of heating is different between adjacent coils, the voltage of each coil at the time of heating becomes low and discharge is less likely to occur. For this reason, since the insulator to be used can be reduced and the space around the furnace body can be widened, workability and safety are improved, and the furnace body arranged at the center of the coil can be easily replaced.

Moreover, even if the furnace body arranged in the center of the coil is enlarged and the gap between the furnace body and the coil is reduced, it is difficult for discharge to occur, the furnace body can be enlarged and the processing capacity can be improved, and the dissolution power efficiency is also improved.

According to one embodiment of the present invention, the induction heating device further comprises an insulating transformer; wherein the high-frequency power source is connected to the high-frequency power source via the insulating transformer, and the plurality of coils (L1, L2, L3, L4, L5, L6, L7, L8) are three or more coils.

Since three or more coils are used, the voltage at the time of heating can be further reduced as compared with the case where only a single coil is used, so that discharge is less likely to occur. For this reason, since the insulator to be used can be reduced and the space around the furnace body can be widened, workability and safety are improved, and the furnace body arranged at the center of the coil can be easily replaced.

Moreover, even if the furnace body arranged in the center of the coil is enlarged and the gap between the furnace body and the coil is reduced, it is difficult for discharge to occur, the furnace body can be enlarged and the processing capacity can be improved, and the dissolution power efficiency is also improved.

According to one embodiment of the present invention, the plurality of coils (L1, L2, L3, L4, L5, L6, L7, L8) are an even number of coils, the coils are configured such that two of the coils surrounds substantially the entire circumference of a central portion of the coils, and half or all of the coils have the same configuration.

Since the coils having the same configuration are used, not only the modularization becomes easy, but also the voltage during heating becomes almost the same, so that the discharge resistance characteristics can be aligned and the design of the apparatus becomes easy.

Further, since each coil does not need to surround the furnace body arranged at the center of the coil by 360 degrees, the coil can be easily manufactured.

According to one embodiment of the present invention the plurality of coils (L1, L2, L3, L4, L5, L6, L7, L8) have the same configuration.

Since the coils having the same configuration are used, not only the module becomes easy, but also the voltage during heating becomes substantially the same, so that the discharge resistance characteristics can be aligned, and the design of the apparatus becomes easy.

According to one embodiment of the present invention, the induction heating device further comprises a coil holding unit; and a coil insertion part configured to insert the coil into the coil holding unit.

The coil can be exchanged by inserting the coil into the coil insertion part, and maintenance management becomes easy.

According to one embodiment of the present invention, each of the plurality of capacitors (C1, C2, C3, C4, C5, C6, C7, C8) is composed of two capacitor components having metal plates, and the capacitor is composed of the capacitor components attached to ends of the plurality of coils (L1, L2, L3, L4, L5, L6, L7, L8).

The capacitor can be configured simply by attaching the capacitor component to the end of the coil, facilitating maintenance and management of the capacitor.

According to one embodiment of the present invention, an electric potential with respect to the ground is 5000 V or less when the plurality of coils (C1, C2, C3, C4, C5, C6, C7, C8) are energized.

The above configuration makes it possible to reduce the voltage at the time of heating as compared with the case where only a single coil is used, so that the discharge is less likely to occur. For this reason, since the insulator to be used can be reduced and the space around the furnace body can be widened, workability and safety are improved, and the furnace body arranged at the center of the coil can be easily replaced.

Moreover, even if the furnace body arranged in the center of the coil is enlarged and the gap between the furnace body and the coil is reduced, it is difficult for discharge to occur, the furnace body can be enlarged and the processing capacity can be improved. The dissolution power efficiency is also improved.

According to one embodiment of the present invention, each of the plurality of coils (L1, L2, L3, L4, L5, L6, L7, L8) has a water cooling part therein.

The cooling effect of the water cooling part can prevent the coil from becoming hot during heating.

The radioactive waste melting apparatus according to one embodiment of the present invention comprises the induction heating device according to any one embodiment of the present invention, including a high frequency furnace body configured to hold a radioactive waste to be heated at the center of the plurality of coils (L1, L2, L3, L4, L5, L6, L7, L8).

With the above configuration, compared to the case where only a single coil is used, the voltage at the time of heating can be lowered, so that discharge is less likely to occur. For this reason, since the insulator to be used can be reduced and the space around the furnace body can be widened, the workability and safety which are important in the handling of radioactive waste are improved, and the furnace body which is arranged at the center of the coil can be replaced easily.

Moreover, even if the furnace body arranged in the center of the coil is enlarged and the gap between the furnace body and the coil is reduced, it is difficult for discharge to occur, the furnace body can be enlarged and the processing capacity can be improved, and the dissolution power efficiency is also improved.

The radioactive waste melting and solidification process device according to one embodiment of the present invention comprises the induction heating device according to any one embodiment of the present invention, including a high frequency furnace body configured to hold a radioactive waste to be heated at the center of the plurality of coils (L1, L2, L3, L4, L5, L6, L7, L8), wherein the high frequency furnace body includes a solidifying member feeding unit configured to feed a solidifying member for solidifying the radioactive waste.

The above configuration makes it possible to reduce the voltage at the time of heating as compared with the case where only a single coil is used, so that the discharge is less likely to occur. For this reason, since the insulator to be used can be reduced and the space around the furnace body can be widened, the workability and safety which are important in the handling of radioactive waste are improved, and the furnace body which is arranged in the center of the coil can be also easily replaced.

Moreover, even if the furnace body arranged in the center of the coil is enlarged and the gap between the furnace body and the coil is reduced, it is difficult for discharge to occur, the furnace body can be enlarged and the processing capacity can be improved, and the dissolution power efficiency is also improved.

MODES FOR CARRYING OUT THE INVENTION

Figure 1:
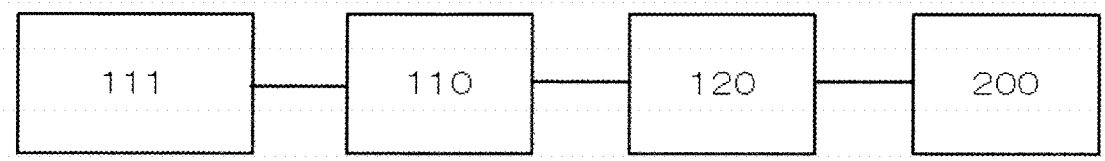
FIG. 1 shows an induction heating device according to an embodiment of the present invention.
Figure 2:
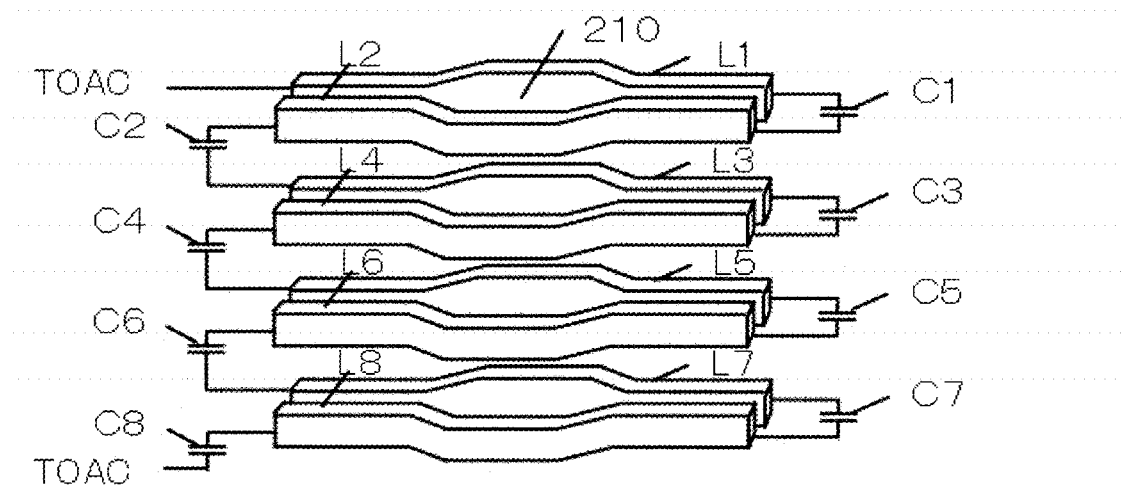
FIG. 2 shows a circuit diagram of an induction heating device according to an embodiment of the present invention.
Figure 3:
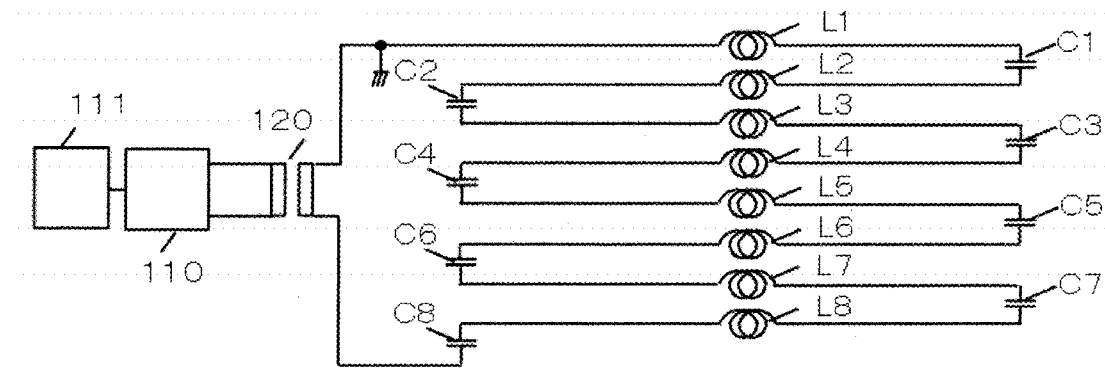
FIG. 3 shows a coil part of an induction heating device according to an embodiment of the present invention.

FIG. 1 shows the overall configuration of an induction heating device 100 according to an embodiment of the present invention. FIG. 2 shows a heating coil unit 200 according to an embodiment of the present invention. FIG. 3 shows a circuit diagram of the induction heating device 100 according to an embodiment of the present invention.

The induction heating device 100 comprises a high frequency power source 110 having a connection unit 111 to an alternating-current power source (AC power source), and a heating coil unit 200 connected to the high frequency power source 110 via an insulating transformer 120. The heating coil unit 200 includes a plurality of coils (L1, L2, L3, L4, L5, L6, L7, L8), and a plurality of capacitors (C1, C2, C3, C4, C5, C6, C7, C8) respectively connected to the plurality of coils.

For the sake of explanation, the voltages at two ends of the coil L1 are V1, V2, the voltages at two ends of the coil L2 are V3, V4, the voltages at two ends of the coil L3 are V5, V6, and the voltages at two ends of the coil L4 are V7, The voltages at two ends of V8, coil L5 are V9, V10, the voltages at two ends of coil L6 are V11, V12, the voltages at two ends of coil L7 are V13, V14, and the voltages at two ends of coil L8 are V15, V16.

The insulation transformer 120 includes two sets of terminals, and one set of terminals is connected to the high frequency power supply 110. One terminal of the other set of terminals is connected to one end of the coil L1 and grounded, and the other terminal of the insulating transformer 120 is connected to one end of the capacitor C8.

The coil L1, the capacitor C1, the coil L2, the capacitor C2, the coil L3, the capacitor C3, the coil L4, the capacitor C4, the coil L5, the capacitor C5, the coil L6, the capacitor C6, the coil L7, the capacitor C7, the coil L8 and the capacitor C8 are connected in series. In other words, the capacitor C1 is connected between the coil L1 and the coil L2, the capacitor C2 is connected between the coil L2 and the coil L3, the capacitor C3 is connected between the coil L3 and the coil L4, and the capacitor C4 is connected between the coil L4 and the coil L5, the capacitor C5 is connected between the coil L5 and the coil L6, the capacitor C6 is connected between the coil L6 and the coil L7, the capacitor C7 is connected between the coil L7 and the coil L8, and the capacitor C8 is connected between the coil L8 and the insulation transformer 120.

The high frequency power source 110 transmits AC power received from the AC power source to the coil side via the insulating transformer 120, and heats the object to be heated disposed in the cavity 210 at the center of the coil.

Figure 4:
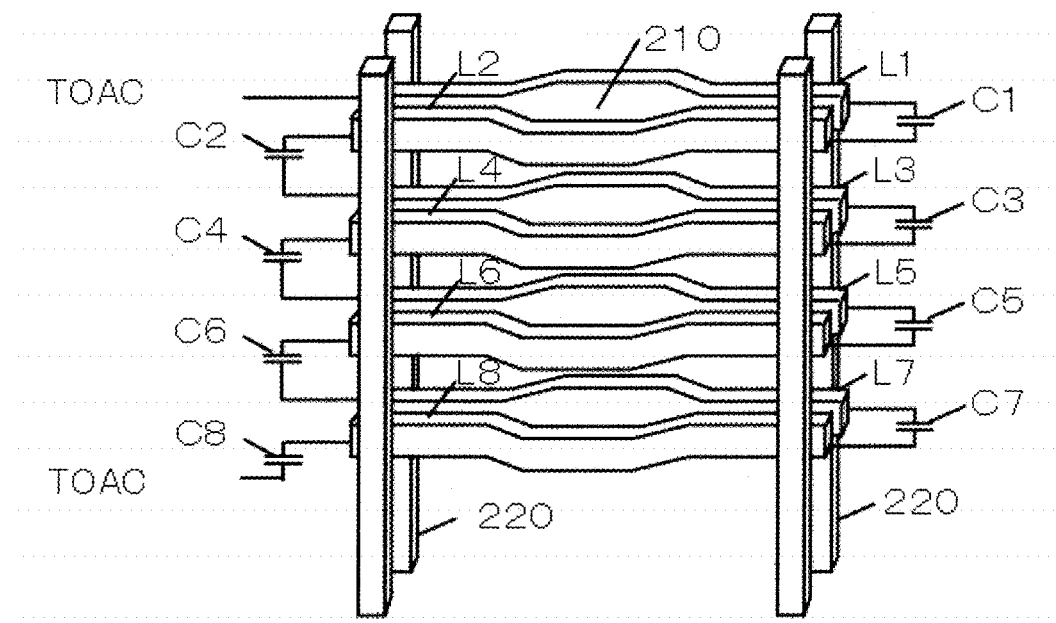
FIG. 4 shows a coil holding unit according to an embodiment of the present invention.
Figure 5:
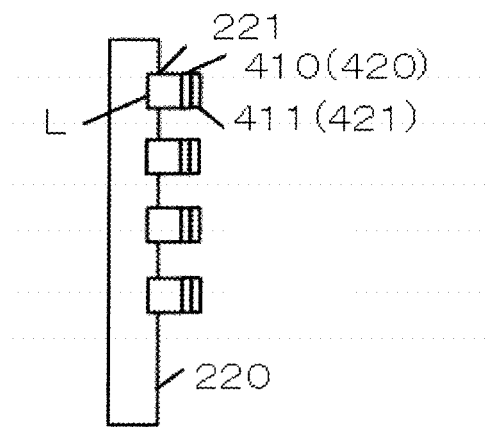
FIG. 5 shows a coil holding unit according to an embodiment of the present invention.
Figure 6:
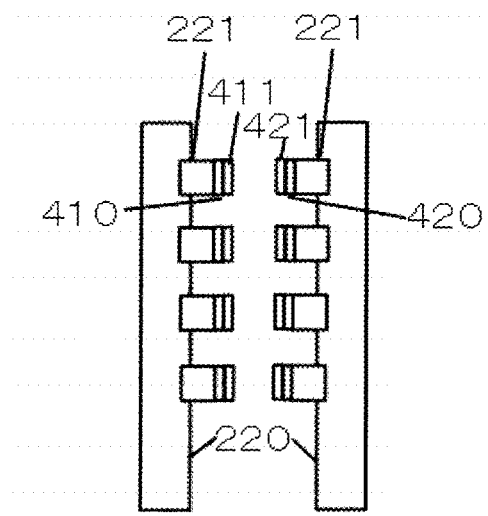
FIG. 6 shows a coil holding unit according to an embodiment of the present invention.

FIG. 4, FIG. 5 and FIG. 6 show the coil holding unit 220 in an embodiment of the present invention.

The induction heating device 100 has a coil holding unit 220. As FIG. 5 shows, the coil holding unit 220 has a coil insertion part 221 in which the coil is inserted.

In an embodiment of the present invention, the capacitor is composed of two capacitor components 410 and 420 having metal plates 411 and 421. As shown in FIG. 6, capacitor components 410 and 420, that is attached to end portions of a plurality of coils, face each other to constitute a capacitor.

As shown in FIG. 2 and FIG. 4, the coils L1, L3, L5, and L7 have the same shape, and the coils L2, L4, L6, and L8 have the same shape. Also, all of the plurality of coils (L1, L2, L3, L4, L5, L6, L7, L8) may have the same shape.

Also, all of the plurality of capacitors (C1, C2, C3, C4, C5, C6, C7, C8) may be the same capacitor.

Figure 7:
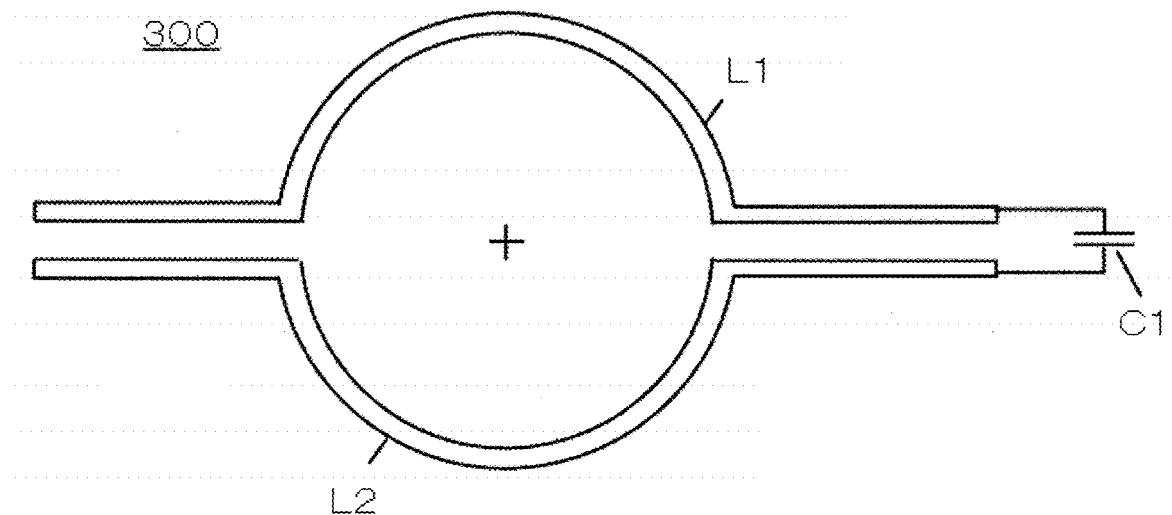
FIG. 7 shows a coil element in a heating coil part of an induction heating device according to an embodiment of the present invention.
Figure 8:
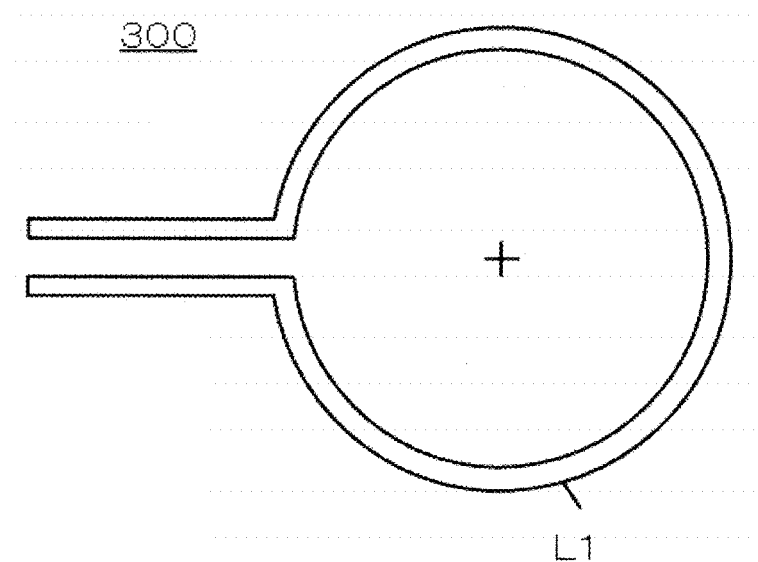
FIG. 8 shows a coil element in a heating coil part of the induction heating device according to an embodiment of the present invention.
Figure 9:
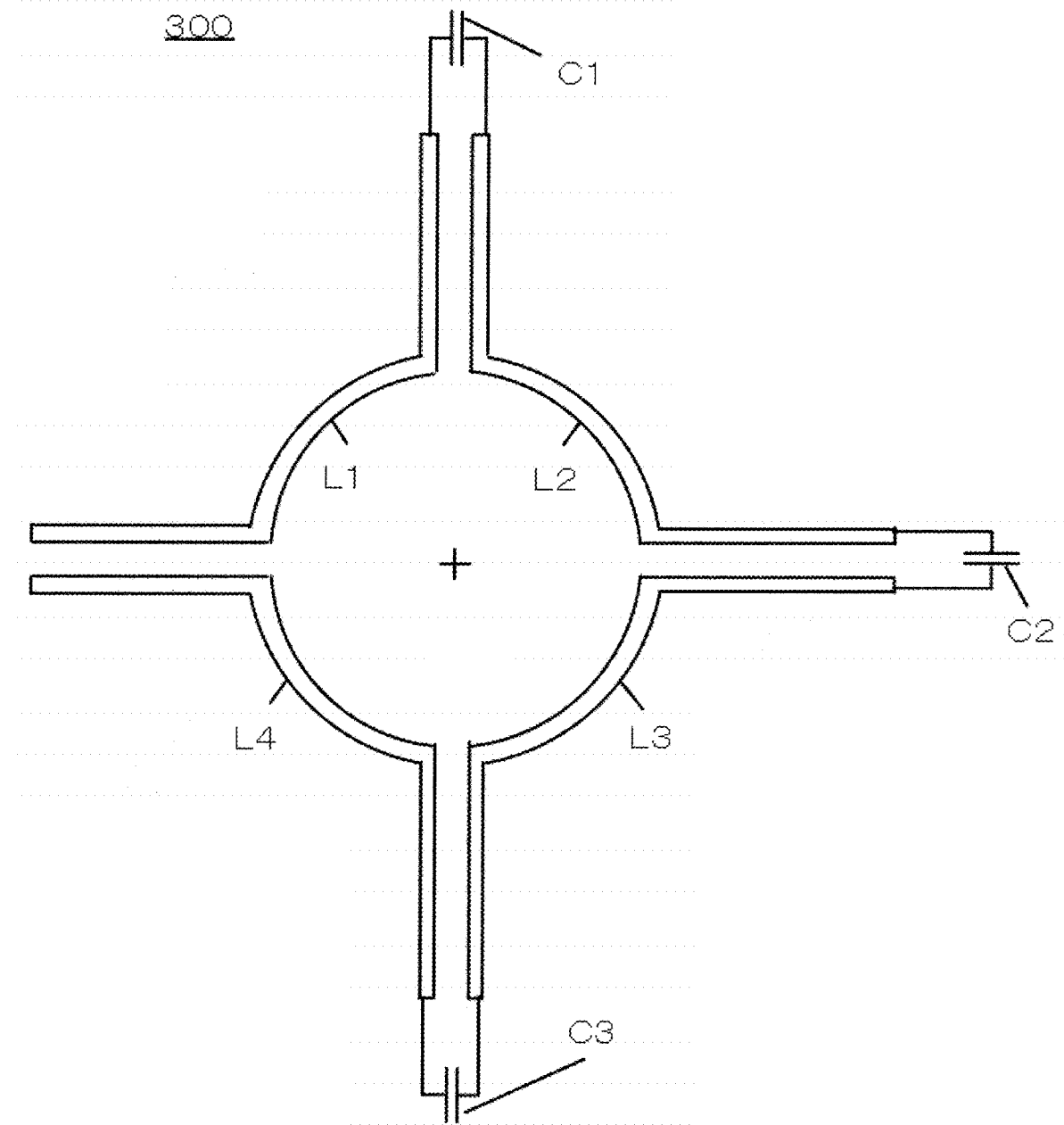
FIG. 9 shows a coil element in a heating coil part of the induction heating device according to an embodiment of the present invention.

FIG. 7, FIG. 8 and FIG. 9 show a coil element 300 in the heating coil unit 200 of the induction heating device 100 in an embodiment of the present invention. The coils surround the cavity 210, which is the central part or the inner part of the coil, in a plane, by two coils L1 and L2. As shown in FIG. 8, the coil element 300 may have a configuration in which the cavity 210 is surrounded by one coil L1 in a plane. On the other case, as shown in FIG. 9, the coils may also be structured such that four coils L1, L2, L3, and L4 surround the cavity 210 in a plane.

The above configuration makes it easy to manufacture the coil part even when the coil is made of a metal plate so that it can handle a large current. Further, in the present invention, by providing a capacitor between the coils, the electric potential to ground of each capacitor can be lowered, while the above configuration makes it easy to provide a capacitor at the end of the coil, and the simplified configuration can be achieved.

Figure 10:
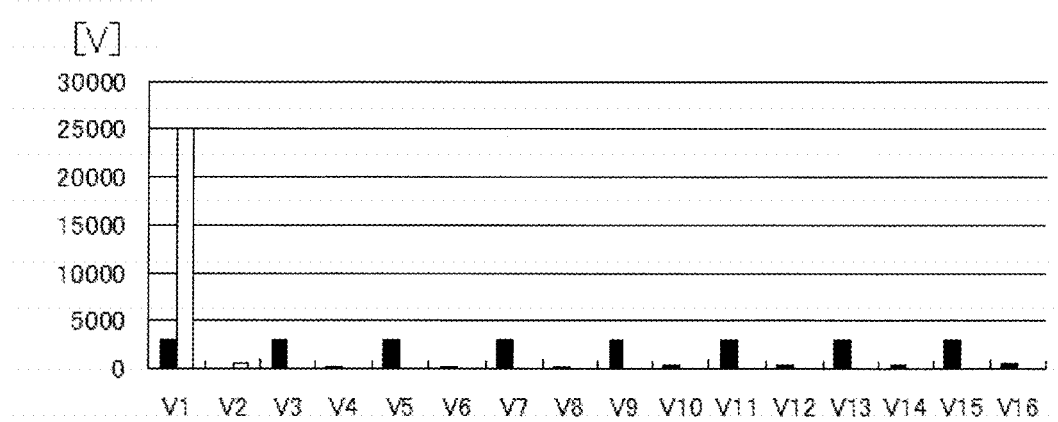
FIG. 10 shows voltage at each point according to an embodiment of the present invention.
Figure 11:
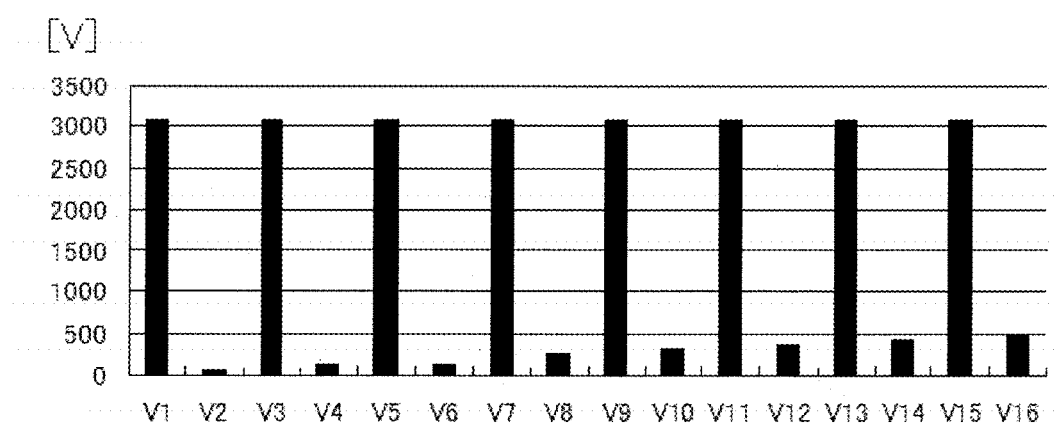
FIG. 11 shows voltage at each point according to an embodiment of the present invention.

FIG. 10 and FIG. 11 show the voltages V1 to V16 as black bars in an embodiment of the present invention. In FIG. 10, for comparison, the voltage at both ends of the coil, when only one coil is applied, is shown as a white bar graph.

The plurality of capacitors (C1, C2, C3, C4, C5, C6, C7, C8) have the capacity such that a high frequency voltage applied from the high frequency power supply 110 have different phases at a plurality of coils (L1, L2, L3, L4, L5, L6, L7), which are adjacent to each other. As a result, when only one coil is applied, the voltage at one end of the coil is about 25000V, whereas in this embodiment using eight coils, the voltages at both ends of the coil are about 3000V.

Figure 12:
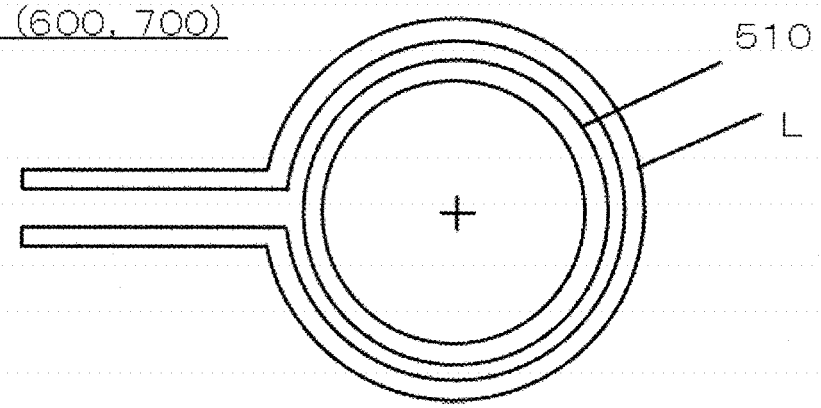
FIG. 12 shows a high frequency furnace equipped with an induction heating device according to an embodiment of the present invention.
Figure 13:
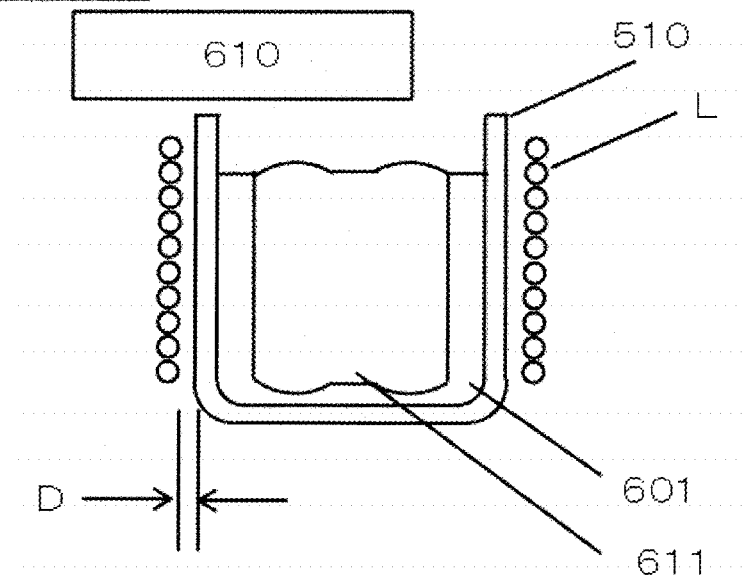
FIG. 13 shows a high-frequency furnace equipped with an induction heating device according to an embodiment of the present invention.

FIG. 12 and FIG. 13 show a radioactive waste melting process device 600 equipped with the induction heating device 100 and a high frequency furnace body 510 in an embodiment of the present invention. In this embodiment, the high frequency furnace body 510 is a glass melting cold crucible high frequency furnace body of a glass melting cold crucible high frequency furnace, and the apparatus as a whole is a radioactive waste melting and solidification process device 700.

The glass melting cold crucible high frequency furnace includes a cold crucible as a furnace body 510 that holds an object to be heated and an induction heating device 100.

In FIG. 13, the high-frequency power source 110 and the insulating transformer 120 of the induction heating device 100 are omitted, but the induction heating device 100 is shown in the embodiment mentioned above, for example. Further, above the furnace body 510 which is a storage part of the object to be heated, a solidifying material input unit 610 for inputting a solidification material 611 for solidifying the object to be heated is provided. In this embodiment, the solidification material 611 is glass.

The induction heating device 100 includes a plurality of coils (L1, L2, L3, L4, L5, L6, L7, L8), and the plurality of coils (L1, L2, L3, L4, L5, L6, L7, L8) are arranged around the cold crucible with a coil-crucible gap with respect to the cold crucible. A space surrounded by the plurality of coils is the cavity 210. Here, the plurality of coils may have a linear shape portion serving as a terminal portion at both ends of a semicircle as shown in FIG. 7, may have a linear shape portion serving as a terminal portion at both ends of a hexagonal half shape consisting of three sides of a hexagon as shown in FIG. 2, or may have another shape. In a case where the plurality of coils are polygonal, are not semicircular or circular, the average gap between the coil and the cold exclusive is called a coil-cold crucible gap D.

Figure 14:
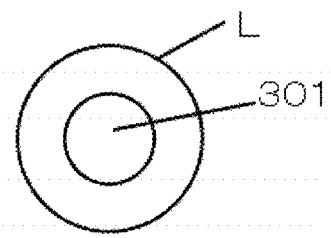
FIG. 14 shows the internal structure of a coil according to an embodiment of the present invention.

FIG. 14 shows the inside of the coil. As shown in FIG. 14, each of the plurality of coils (L1, L2, L3, L4, L5, L6, L7, L8) has a water cooling part 301 therein.

In this embodiment, glass is charged from the solidified material input unit 610, and the glass melts in the skull layer 601 in a cold crucible as the furnace body 510.

In particular, a high frequency such as several hundred kHz is required during melting of the cold exclusive glass. For this reason, since the coil becomes large and the inductance of the coil also increases, the voltage of the coil increases and the problem of withstand voltage arises. However, since the coil voltage can be lowered in the present embodiment, the problem of withstand voltage can be solved, and a high-efficiency and highly durable high-frequency furnace can be provided.

As described above, the glass melting cold crucible high-frequency furnace in the present embodiment solves the problem of pressure resistance and is highly efficient and durable, such that the glass melting cold crucible high-frequency furnace is also useful as an radioactive waste melting and solidification process device which encloses radioactive waste in glass. Further, since the coil and the capacitor can be easily modularized, the coil and the capacitor can be easily exchanged.

It goes without saying that the present invention is not limited to the above-described embodiments and includes various embodiments without departing from the spirit and scope of the present invention.

For example, the number of coils may be other than 8 as long as it is plural.

In the example shown in FIG. 2, the same number of coils and capacitors are provided. In other case, capacitors such as a capacitor L0, a coil L1, a capacitor L1, a coil L2, and a capacitor L2 may be connected in series from one terminal side of the insulating transformer 120, such that capacitors and coils may be alternately connected, and n coils and n+1 capacitors may be employed.

The capacitor can be configured by attaching two capacitor components to the end of the coil, respectively, but the capacitor is configured as one capacitor by connecting two capacitor components in advance through a dielectric or the like, such that the capacitor may be inserted between the ends of the two coils.

Figure 15:
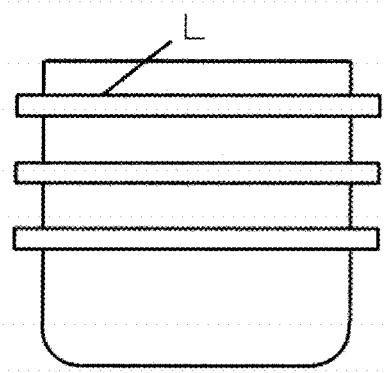
FIG. 15 shows the arrangement of coils according to an embodiment of the present invention.
Figure 16:
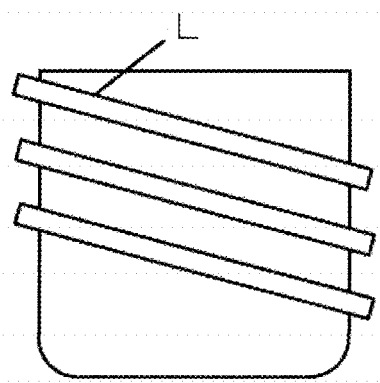
FIG. 16 shows the arrangement of coils according to an embodiment of the present invention.

In the embodiment described above, the coil is arranged substantially horizontally as shown in FIG. 15. In other case, as long as the cavity 210 is surrounded by n coils in a plane, wherein n is an integer of 1 or more, the coil L may be arranged in a state other than horizontal as shown in FIG. 16.

EXPLANATION OF REFERENCE NUMERALS

100 Induction heating device
111 Connection unit
110 High frequency power supply
120 Insulation transformer
200 Heating coil unit
210 Cavity
220 Coil holding unit
221 Coil insertion part
300 Coil element
301 Water cooling part
410, 420 Capacitor components
411, 421 Capacitor metal plates
500 High frequency furnace body
600 Radioactive waste melting process device
601 Skull layer
610 Solidification material input unit
611 Solidification material
700 Radioactive waste melting and solidification process device
C, C1, C2, C3, C4, C5, C6, C7, C8 Capacitors
L, L1, L2, L3, L4, L5, L6, L7, L8 Coils
D Coil—cold crucible gap

The invention claimed is:
1. An induction heating device comprising:
a high frequency power supply having a connection unit to an alternating-current supply, and a heating coil unit connected to the high frequency power supply; wherein
the heating coil unit includes a plurality of coils (L1 ... Ln) and a plurality of capacitors (C1 ... Cn),
the heating coil unit has a cavity portion surrounded by the plurality of coils (L1 ... Ln),
the plurality of coils (L1 ... Ln) surround the cavity portion with n coils in a plane, wherein n is an integer of 2 or more,
the plurality of coils (L1 ... Ln) are mutually connected in series via one of the plurality of capacitors (C1 ... Cn), and
the capacitor Cn is connected between the high frequency power supply and the coil Ln in series.
2. The induction heating device according to claim 1, further comprising an insulating transformer; wherein
the heating coil unit is connected to the high frequency power source via the insulating transformer, and the plurality of coils (L1 ... Ln) are three or more coils.
3. The induction heating device according to claim 2, wherein the plurality of coils (L1 ... Ln) have the same configuration.

4. The induction heating device according to claim 1, wherein
the plurality of coils (L1 ... Ln) are an even number of coils,
the coils are configured such that two of the coils surrounds substantially the entire circumference of a central portion of the coils, and
half or all of the coils have the same configuration.

5. The induction heating device according to claim 1, further comprising:
a coil holding unit; and
a coil insertion part configured to insert the coil into the coil holding unit.

6. The induction heating device according to claim 1, wherein
each of the plurality of capacitors (C1 ... Cn) is composed of two capacitor components having metal plates, and the capacitor is composed of the capacitor components attached to ends of the plurality of coils (L1 ... Ln).

7. The induction heating device according to claim 1, wherein an electric potential with respect to the ground is 5000 V or less when the plurality of coils (L1 ... Ln) are energized.

8. The induction heating device according to claim 1, wherein each of the plurality of coils (L1 ... Ln) has a water cooling part therein.

9. A radioactive waste melting process apparatus, comprising:
the induction heating device according to claim 1, including
a high frequency furnace body configured to hold a radioactive waste to be heated at the center of the plurality of coils (L1 ... Ln).

10. A radioactive waste melting and solidification process device, comprising:
the induction heating device according to claim 1, including
a high frequency furnace body configured to hold a radioactive waste to be heated at the center of the plurality of coils (L1 ... Ln), wherein
the high frequency furnace body includes a solidifying member feeding unit configured to feed a solidifying member for solidifying the radioactive waste.

11. An induction heating device comprising:
a high frequency power supply having a connection unit to an alternating-current supply, and a heating coil unit connected to the high frequency power supply; wherein
the heating coil unit includes a plurality of coils (L1 ... Ln) and a plurality of capacitors (C1 ... Cn),
the heating coil unit has a cavity portion surrounded by the plurality of coils (L1 ... Ln),
the plurality of coils (L1 ... Ln) surround the cavity portion with n coils in a plane, wherein n is an integer of 2 or more,
the plurality of coils (L1 ... Ln) are mutually connected in series via one of the plurality of capacitors (C1 ... Cn), and
the induction heating device has a plurality of capacities (C1 ... Cn) such that a high frequency voltage applied from the high frequency power source has different phases at the plurality of adjacent coils (L1 ... Ln).

* * * * *